UNITED STATES PATENT OFFICE.

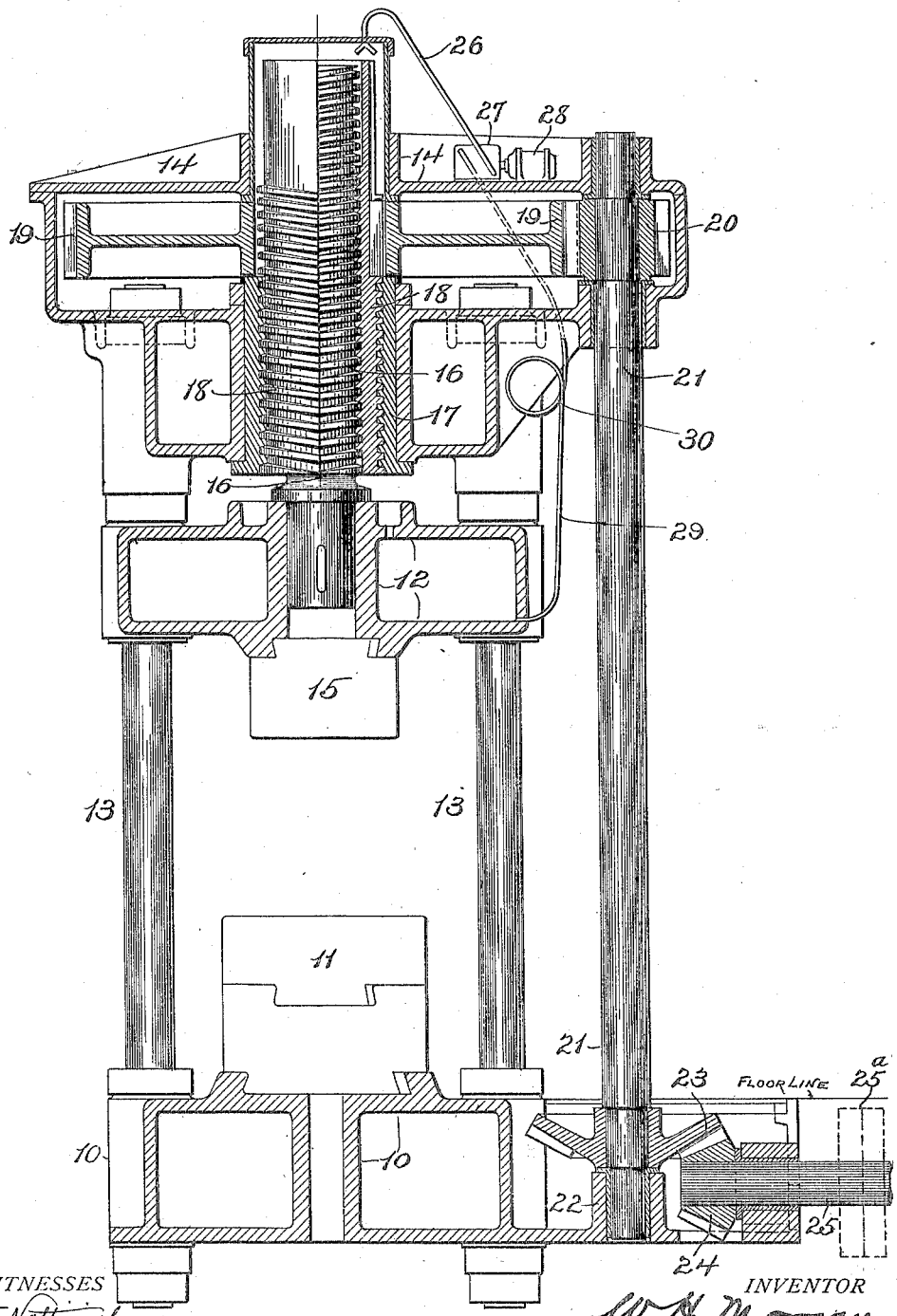

WILLIAM HENRY MORGAN, OF ALLIANCE, OHIO.

FORGING, FLANGING, AND OTHER PRESS.

1,273,265.   Specification of Letters Patent.   Patented July 23, 1918.

Application filed May 5, 1917. Serial No. 166,735.

*To all whom it may concern:*

Be it known that I, WILLIAM H. MORGAN, a citizen of the United States and a resident of Alliance, in the county of Stark and State of Ohio, have invented certain new and useful Improvements in Forging, Flanging, and other Presses; and I do hereby declare the following to be a full, clear, and exact description of the invention, such as will enable others skilled in the art to which it appertains to make and use the same.

My invention relates to improvements in forging, flanging and other presses.

Heretofore presses of this type, designed for heavy work, have been operated by hydraulic mechanism which is necessarily complicated in construction and requires constant attention, frequent repairs and adjustment of parts in order to maintain them in proper working condition.

The object of my invention is to simplify and consequently cheapen the cost of construction and the expense of upkeep, by dispensing with the hydraulic devices and actuating the movable platen by a screw driven by an electric motor, and it consists in the parts and combination of parts and in the details of construction as will be more fully explained and pointed out in the claims.

The accompanying drawing is a view in section of a press embodying my invention.

While I have illustrated my improvement as applied to forging presses it is equally applicable to flanging, bending and other presses, hence I would have it understood that it is not confined in its application to any particular kind of press, but is equally applicable to all apparatus of the types above referred to.

10 is the lower platen carrying an anvil or die 11, and 12 is a movable platen mounted to move vertically on the four cylindrical columns 13 which latter are connected at their upper ends by the upper fixed platen 14. The columns 13 are solidly secured at their lower ends to the platen 10, and at their upper ends to the top platen 14, and the movable platen 12 is provided at its four corners with integral or rigid sleeves which embrace said columns and guide the said platen 12 in its up and down movements.

Platen 12 is provided on its lower face with a die or other tool 15, and is keyed to the lower end of the screw 16, which is located centrally with relation to the platens 12 and 14. Platen 14 is preferably made hollow or of skeleton form, and is provided centrally with a vertical cylindrical opening in which the internally threaded and fixed nut 17 is secured. Mounted within the fixed nut 17, is the internally and externally threaded nut 18, the external threads of which engage the internal threads on the nut 17, while the internal threads on nut 18 engage or mesh with the threads on screw 16.

Connected to nut 18 by a spline and groove connection, so as to permit of a longitudinal movement of the said nut, is the gear wheel 19, which latter is housed in the upper platen 14 and which meshes with the smaller pinion 20 on vertical shaft 21, which has bearing at its lower end in the step 22 preferably formed integral with the lower platen 10. This shaft 21 is provided preferably with a bevel gear wheel 23 which meshes with a similar gear wheel 24 secured to the drive shaft 25, which latter is preferably located below the floor line and should be provided with a clutch 25ª of any approved construction so that when the platens come together, the clutch will slip or yield so as to prevent the motor from burning out.

The gear wheel 19 and pinion 20 are housed within the upper platen, which housing also forms an oil chamber and is kept supplied with oil through the pipe 26 from the pump 27, the latter being actuated by motor 28, and connected with the oil reservoir in the movable platen 12 by the pipe 29.

The pipe is coiled as shown at 30, so as to permit it to accommodate itself to the movement of the movable platen 12. The movable nut 18 moves in the fixed nut 17, and the screw 16, which is fixed to the movable platen, is moved longitudinally both by the longitudinal movement of the movable nut 18 in the fixed nut, and by the engagement of its threads with the internal threads of the movable nut. The threads on the nuts and screw are so formed that the movable nut 18 and the screw 16 always move in the same direction, the movable nut moving in the fixed nut and on the screw 16, so that the movable platen carried by the screw has a vertical movement, up and down equal to the combined movements of the movable nut in the fixed nut and also the screw.

It will therefore be seen that by rotating gear wheel 19, the movable nut 18 will be rotated and also moved longitudinally in the fixed nut, and the screw 16 will be moved longitudinally in the movable nut, thus moving the upper anvil 15 toward or away from the lower anvil, the speed of such movement being controlled by the motor controlling devices.

It is evident that many slight changes might be resorted to in the relative arrangement of parts shown and described without departing from the spirit and scope of my invention as claimed. Hence I would have it understood that I do not wish to restrict myself to the exact construction and arrangement of parts shown, but Having fully described my invention what I claim as new and desire to secure by Letters-Patent, is:—

1. In a press for forging, flanging, etc., the combination of fixed upper and lower platens, a plurality of columns secured to the lower platen and carrying the upper platen, a movable platen mounted on the columns intermediate the two fixed platens, a screw secured to the movable platen and projecting upwardly into the upper fixed platen, a nut mounted in said upper platen and meshing with the screw on the movable platen, and gearing housed within the upper fixed platen for rotating the nut.

2. In a press for forging, flanging, etc., the combination of fixed upper and lower platens, an intermediate movable platen, a screw fixed to said movable platen and projecting upwardly into the upper fixed platen, a nut mounted in said upper platen and meshing with the screw on the movable platen, a gear wheel housed in the upper platen and engaging the nut for rotating the same, a pinion also housed in said upper platen and meshing with said gear wheel and a driven shaft journaled at its ends in the two fixed platens and carrying the said pinion.

3. In a press for forging, flanging, etc., the combination of a fixed platen and a movable platen, a screw carrying the latter, a fixed nut secured to the fixed platen, an internally and externally threaded nut engaging the nut in the fixed platen and also the screw on the movable platen, and gearing connected with said internally and externally threaded nut for turning the same.

4. In a press for forging, flanging, etc., the combination of a fixed platen and a movable platen, a screw carrying the latter, a fixed nut secured to the fixed platen, an internally and externally threaded nut engaging the nut in the fixed platen and also the screw on the movable platen, and gearing housed within the fixed platen for rotating the internally and externally threaded nut.

5. In a press for forging, flanging, etc., the combination of a fixed platen and a movable platen, a screw carrying the latter, a fixed nut secured to the fixed platen, an internally and externally threaded nut meshing with the fixed nut and also the screw on the movable platen, a gear wheel having a spline and a groove connection with the internally and externally threaded nut and gearing for actuating said gear wheel.

In testimony whereof, I have signed this specification in the presence of two subscribing witnesses.

WILLIAM HENRY MORGAN.

Witnesses:
N. C. FETTERS,
C. R. RICHARDS.

Copies of this patent may be obtained for five cents each, by addressing the "Commissioner of Patents, Washington, D. C."